US006182185B1

United States Patent
Stokes (10) Patent No.: US 6,182,185 B1
(45) Date of Patent: Jan. 30, 2001

(54) PORT SWITCHES

(75) Inventor: David H. Stokes, Nevada City, CA (US)

(73) Assignee: ADC Telecommunications, Inc., Minneapolis, MN (US)

( * ) Notice: Under 35 U.S.C. 154(b), the term of this patent shall be extended for 0 days.

(21) Appl. No.: 09/198,026

(22) Filed: Nov. 23, 1998

(51) Int. Cl.$^7$ .................................................. G06F 13/00
(52) U.S. Cl. ............................................ 710/132; 709/238
(58) Field of Search ................................... 370/229–236; 375/219–220; 709/238–244; 710/129–132; 711/12

(56) References Cited

U.S. PATENT DOCUMENTS

| 5,345,556 | * | 9/1994 | Zapisek | 709/244 |
| 5,347,450 | * | 9/1994 | Nugent | 709/243 |
| 5,398,317 | * | 3/1995 | Nugent | 709/248 |
| 5,420,982 | * | 5/1995 | Take | 712/12 |
| 5,751,764 | * | 5/1998 | Meyer et al. | 375/219 |
| 5,920,708 | * | 7/1999 | Gates et al. | 710/100 |
| 5,964,835 | * | 10/1999 | Fowler et al. | 709/216 |
| 5,983,269 | * | 11/1999 | Mattson et al. | 709/221 |
| 6,046,979 | * | 4/2000 | Bauman | 370/229 |
| 6,078,963 | * | 6/2000 | Civanlar et al. | 709/238 |

* cited by examiner

Primary Examiner—Christopher B. Shin
(74) Attorney, Agent, or Firm—John Smith-Hill; Smith-Hill and Bedell (57) ABSTRACT

A port switch includes n bidirectional communication ports and a router having n inputs connected to the n ports respectively and n outputs connected to the n ports respectively and including a staging RAM and a switch responsive to data in the staging RAM for connecting the ith router input to the jth router output and for connecting the kth router input to the lth router input. A source lookup table contains, for each port, an entry specifying the router input that is connected to that port and a destination lookup table contains, for each port, an entry specifying the router output that is connected to that port. Forward and reverse connections are established between a uth port (1<=u<=n) and a vth port (1<=v<=n) by addressing the source lookup table with addresses associated with the uth and vth ports and reading respective router inputs and addressing the destination lookup table with addresses associated with the uth and vth ports and reading respective router outputs. A matrix image data structure is created containing entries specifying at least the router inputs for the uth and vth ports and the router outputs for the uth and vth ports. The router input and router output entries in the matrix image data structure are utilized to refresh the staging RAM of the router.

21 Claims, 4 Drawing Sheets

PORT SWITCHES

BACKGROUND OF THE INVENTION

This invention relates to improvements in or relating to port switches.

A port switch includes n bidirectional I/O communication ports, where n>2, each port having at least a first state in which it propagates a signal in a first direction and a second state in which it propagates a signal in a second direction, an addressable latch means having n outputs connected to the ports respectively for establishing the state of each port, and a router having n inputs connected to the n ports respectively and n outputs connected to the n ports respectively and including an addressable register means which can be loaded with data defining at least a first connection through the router between the ith router input (1<=i<=n) and the jth router output (1<=j<=n) and a second connection through the router between the kth router input (1<=k<=n and k i) and the lth router output (1<=l<=n and l j), and a switch means responsive to the data in the addressable register means for connecting the ith router input to the jth router output and for connecting the kth router input to the lth router input.

A known port switch is described in U.S. Pat. No. 5,751,764, the disclosure of which is hereby incorporated by reference herein.

A television post production facility comprises an ensemble of machines of various types, such as editors, digital video effects devices and video tape recorders (VTRs). During an editing session, the producer employs an editor to control the operations (playback, record, etc.) performed by the other machines to produce a final master tape. A first video tape recorder may be controlled by the editor when recording source material, and when dubbing the recorded material to a second VTR, the first VTR may control operation of the second VTR.

Each machine may have an RS-422 communication port for transmitting and receiving messages relating to operation of the machine. RS-422 specifies a 9-pin connection and defines a port that is active as being either controlled or controlling. A controlling port receives on pins 2 and 7 and transmits on pins 3 and 8 whereas a controlled port receives on pins 3 and 8 and transmits on pins 2 and 7. When a controlling port is connected to a controlled port, forward messages are transmitted from the controlling port to the controlled port on pins 3 and 8 and reverse messages are transmitted from the controlled port to the controlling port on pins 2 and 7. Ports of the same type are not connected together.

In a given post production facility, several editing sessions, each requiring use of an editor and two or more other machines, may be conducted at any given time, and during a given editing session, the producer might wish to add machines to, and drop machines from, the suite of machines that are being used in the session. In order to allow an ensemble of machines to be interconnected in a flexible fashion in different suites, without needing to swap cables whenever a change is desired, the RS-422 ports of the machines may be connected to respective ports of a port switch.

The suite might be composed of only two machines, in which case one machine, designated a source machine, transmits command messages over a forward path and the other machine, designated a destination machine, transmits response messages over a reverse path. The connection between the source machine and the destination machine is referred to as a non-distributed connection. More generally, however, the suite contains at least three machines. One source machine transmits command messages to two or more destination machines, which generate response messages. In order to prevent a collision of response messages, a single destination machine is designated as the responding machine and the response messages of the other destination machines are blocked. Such a connection is referred to as a distributed connection.

When a machine in a distributed connection is assigned to a new connection, it is necessary to ensure that all destination machines in the current connection, and not just the responding destination machine, are disconnected in order to avoid undesired operation. It is not possible to poll the destination machines, because the response messages from the non-responding destination machines are blocked. Therefore it is normal practice to keep track of the current configuration of the suite.

U.S. Pat. No. 5,751,764 discloses a method for controlling the ports of a port switch using forward and reverse memories, each having one addressable location for each port of the port switch. The contents of the forward memory for a given port indicate whether the port is in use and, if so, whether it is a source or a destination, i.e. whether the port is connected to a source machine or a destination machine, and the contents of the reverse memory for a given port indicate whether the destination is a responding destination or a non-responding destination. In order to break down a distributed connection involving a given source machine, it is necessary to check the connection status of every port of the port switch in order to identify all the destination machines that are connected to the source machine. This is done by scanning the entire contents of the reverse memory. Then, each connection is broken. The operation of checking the status of each port is time consuming and imposes restrictions on the speed at which the port switch can be reconfigured. In some types of operation, it may be desirable to select a port for only a very short interval, for example a few frames of video material, and then release the port so that the associated machine will be available to other suites. This requires that it be possible to reconfigure the port switch at very rapidly, sometimes in as short a time as one vertical interval of a video signal (16.67 ms in the case of signals in the NTSC format).

SUMMARY OF THE INVENTION

According to a first aspect of the present invention there is provided a method of operating a port switch including n bidirectional communication ports, where n>2, and a router having n inputs connected to the n ports respectively and n outputs connected to the n ports respectively and including an addressable register means which can be loaded with data defining at least a first connection through the router between the ith router input (1<=i<=n) and the jth router output (1<=j<=n) and a second connection through the router between the kth router input (1<=k<=n and k i) and the lth router output (1<=l<=n and l j), and a switch means responsive to the data in the addressable register means for connecting the ith router input to the jth router output and for connecting the kth router input to the lth router input, the method comprising creating a source lookup table containing, for each port, an entry specifying the router input that is connected to that port, creating a destination lookup table containing, for each port, an entry specifying the router output that is connected to that port, and establishing forward and reverse connections between a uth port (1<=u<=n) and a vth port (1<=v<=n) by addressing the source lookup table with addresses associated with the uth and vth ports and reading respective router inputs, addressing the destination lookup table with addresses associated with the uth and vth ports and reading respective router outputs, creating a matrix image data structure containing entries specifying at least the router inputs for the uth and vth ports and the router outputs for the uth and vth ports, and utilizing the router input and router output entries in the matrix image data structure to refresh the addressable register means.

According to a second aspect of the present invention there is provided a method of operating a port switch including n bidirectional I/O communication ports, where n>2, each port having at least a first state in which it propagates a signal in a first direction and a second state in which it propagates a signal in a second direction, an addressable latch means having n outputs connected to the ports respectively for establishing the state of each port, and a router having n inputs connected to the n ports respectively and n outputs connected to the n ports respectively and including an addressable register means which can be loaded with data defining at least a first connection through the router between the ith router input ($1<=i<=n$) and the jth router output ($1<=j<=n$) and a second connection through the router between the kth router input ($1<=k<=n$ and k i) and the lth router output ($1<=l<=n$ and l j), and a switch means responsive to the data in the addressable register means for connecting the ith router input to the jth router output and for connecting the kth router input to the lth router input, the method comprising creating a source lookup table containing, for each port, an entry specifying the router input that is connected to that port, creating a destination lookup table containing, for each port, an entry specifying the router output that is connected to that port, and establishing a connection between a uth port ($1<=u<=n$) in a first operating state and a vth port ($1<=v<=n$) in a second operating state by addressing the source lookup table with an address associated with the uth port and reading a router input, addressing the destination lookup table with an address associated with the destination port and reading a router output, creating a matrix image data structure containing, for the uth port, entries specifying at least the router input for the uth port, the first operating state, and the router output connected to the vth port, and, for the vth port, entries specifying at least the router input for the vth port, the second operating state, and the router output connected to the uth port, and utilizing the operating state entries in the matrix image data structure for the uth and vth ports to refresh the addressable latch means and utilizing the router input and router output entries in the matrix image data structure for the uth and vth ports to refresh the addressable register means.

According to a third aspect of the present invention there is provided a method of operating a port switch including a plurality of communication ports and a router including an addressable register which can be loaded with data defining a connection between two of said ports, the method comprising establishing a new connection within a specified time interval by inputting a value specifying a first port, inputting a value specifying a second port, specifying a time interval, creating a data structure containing at least an address for the first port, an address for the second port and the specified time value, measuring lapse of time toward start of the specified time interval, before start of the specified time interval, transferring data from the data structure to a refresh memory means, during the specified time interval, refreshing the addressable register with the contents of the refresh memory means.

According to a fourth aspect of the present invention there is provided a method of operating a port switch including a plurality of communication ports and a router including an addressable register which can be loaded with data defining a connection between two of said ports for connecting those ports, comprising creating a source lookup table containing, for each port, an entry specifying a router input that is connected to that port, creating a destination lookup table containing, for each port, an entry specifying a router output that is connected to that port, establishing a connection between a source port and a destination port by addressing the source lookup table with an address associated with the source port, addressing the destination lookup table with an address associated with the destination port, inputting a time stamp value specifying start of a time interval, creating a matrix image data structure containing, for the source port, entries specifying at least the router input for the source port, the state of the port when a pending connection is made, the router output for the destination port, and the time stamp, before the start of the time interval specified by the time stamp value, transferring data from the matrix image to a matrix refresh memory means, and during said time interval, refreshing the crosspoint register with the input and output data from the matrix image.

According to a fifth aspect of the present invention there is provided a port switch including n bidirectional communication ports, where n>2, and a router having n inputs connected to the n ports respectively and n outputs connected to the n ports respectively and including an addressable register means which can be loaded with data defining at least a first connection through the router between the ith router input ($1<=i<=n$) and the jth router output ($1<=j<=n$) and a second connection through the router between the kth router input ($1<=k<=n$ and k i) and the lth router output ($1<=l<=n$ and l j), a switch means responsive to the data in the addressable register means for connecting the ith router input to the jth router output and for connecting the kth router input to the lth router input, and a controller programmed to operate the port switch in accordance with a method which comprises creating a source lookup table containing, for each port, an entry specifying the router input that is connected to that port, creating a destination lookup table containing, for each port, an entry specifying the router output that is connected to that port, and establishing forward and reverse connections between a uth port ($1<=u<=n$) and a vth port ($1<=v<=n$) by addressing the source lookup table with addresses associated with the uth and vth ports and reading respective router inputs, addressing the destination lookup table with addresses associated with the uth and vth ports and reading respective router outputs, creating a matrix image data structure containing entries specifying at least the router inputs for the uth and vth ports and the router outputs for the uth and vth ports, and utilizing the router input and router output entries in the matrix image data structure to refresh the addressable register means.

According to a sixth aspect of the present invention there is provided a port switch including n bidirectional I/O communication ports, where n>2, each port having at least a first state in which it propagates a signal in a first direction and a second state in which it propagates a signal in a second direction, an addressable latch means having n outputs connected to the ports respectively for establishing the state of each port, and a router having n inputs connected to the n ports respectively and n outputs connected to the n ports respectively and including an addressable register means which can be loaded with data defining at least a first connection through the router between the ith router input (1<=i<=n) and the jth router output (1<=j<=n) and a second connection through the router between the kth router input (1<=k<=n and k i) and the lth router output (1<=l<=n and l j), a switch means responsive to the data in the addressable register means for connecting the ith router input to the jth router output and for connecting the kth router input to the lth router input, and a controller programmed to operate the port switch in accordance with a method comprising creating a source lookup table containing, for each port, an entry specifying the router input that is connected to that port, creating a destination lookup table containing, for each port, an entry specifying the router output that is connected to that port, and establishing a connection between a uth port (1<=u<=n) in a first operating state and a vth port (1<=v<=n) in a second operating state by addressing the source lookup table with an address associated with the uth port and reading a router input, addressing the destination lookup table with an address associated with the destination port and reading a router output, creating a matrix image data structure containing, for the uth port, entries specifying at least the router input for the uth port, the first operating state, and the router output connected to the vth port, and, for the vth port, entries specifying at least the router input for the vth port, the second operating state, and the router output connected to the uth port, and utilizing the operating state entries in the matrix image data structure for the uth and vth ports to refresh the addressable latch means and utilizing the router input and router output entries in the matrix image data structure for the uth and vth ports to refresh the addressable register means.

According to a seventh aspect of the present invention there is provided a port switch including a plurality of communication ports, a router including an addressable register which can be loaded with data defining a connection between two of said ports for connecting those ports, and a controller programmed to operate the port switch in accordance with a method which comprises establishing a new connection at a specified time by inputting a value specifying a first port, inputting a value specifying a second port, specifying a time interval, creating a data structure containing at least an address for the first port, an address for the second port and the specified time value, measuring lapse of time toward start of the specified time interval, before start of the specified time interval, transferring the contents of the data structure to a refresh memory means, during the specified time interval, refreshing the addressable register with the contents of the refresh memory means.

According to an eighth aspect of the present invention there is provided a port switch including a plurality of communication ports, a router including an addressable register which can be loaded with data defining a connection between two of said ports for connecting those ports, an a controller programmed to operate the port switch by a method comprising creating a source lookup table containing, for each port, an entry specifying a router input that is connected to that port, destination lookup table containing, for each port, an entry specifying a router output that is connected to that port, establishing a connection between a source port and a destination port by addressing the source lookup table with an address associated with the source port, addressing the destination lookup table with an address associated with the destination port, inputting a time stamp value specifying start of a time interval, creating a matrix image data structure containing, for the source port, entries specifying at least the router input for the source port, the state of the port when a pending connection is made, the router output for the destination port, and the time stamp, before the start of the time interval specified by the time stamp value, transferring the contents of the matrix image to a matrix refresh memory means, and during said time interval, refreshing the crosspoint register with the input and output data from the matrix image.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
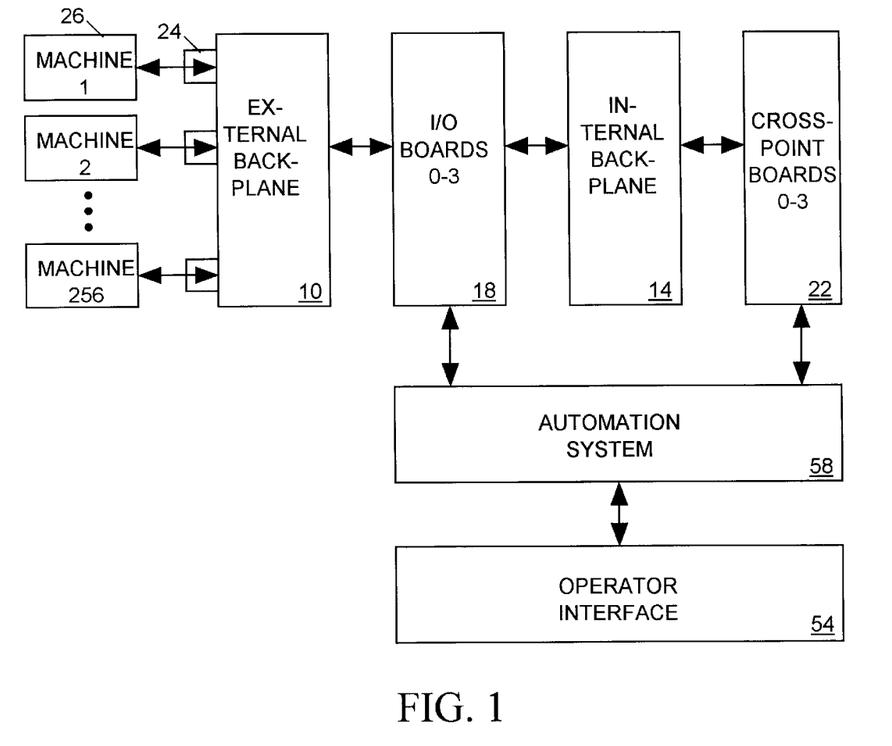
FIG. 1 is a block diagram of a port switch in accordance with the present invention, including an operator interface and an automation system.
Figure 2:
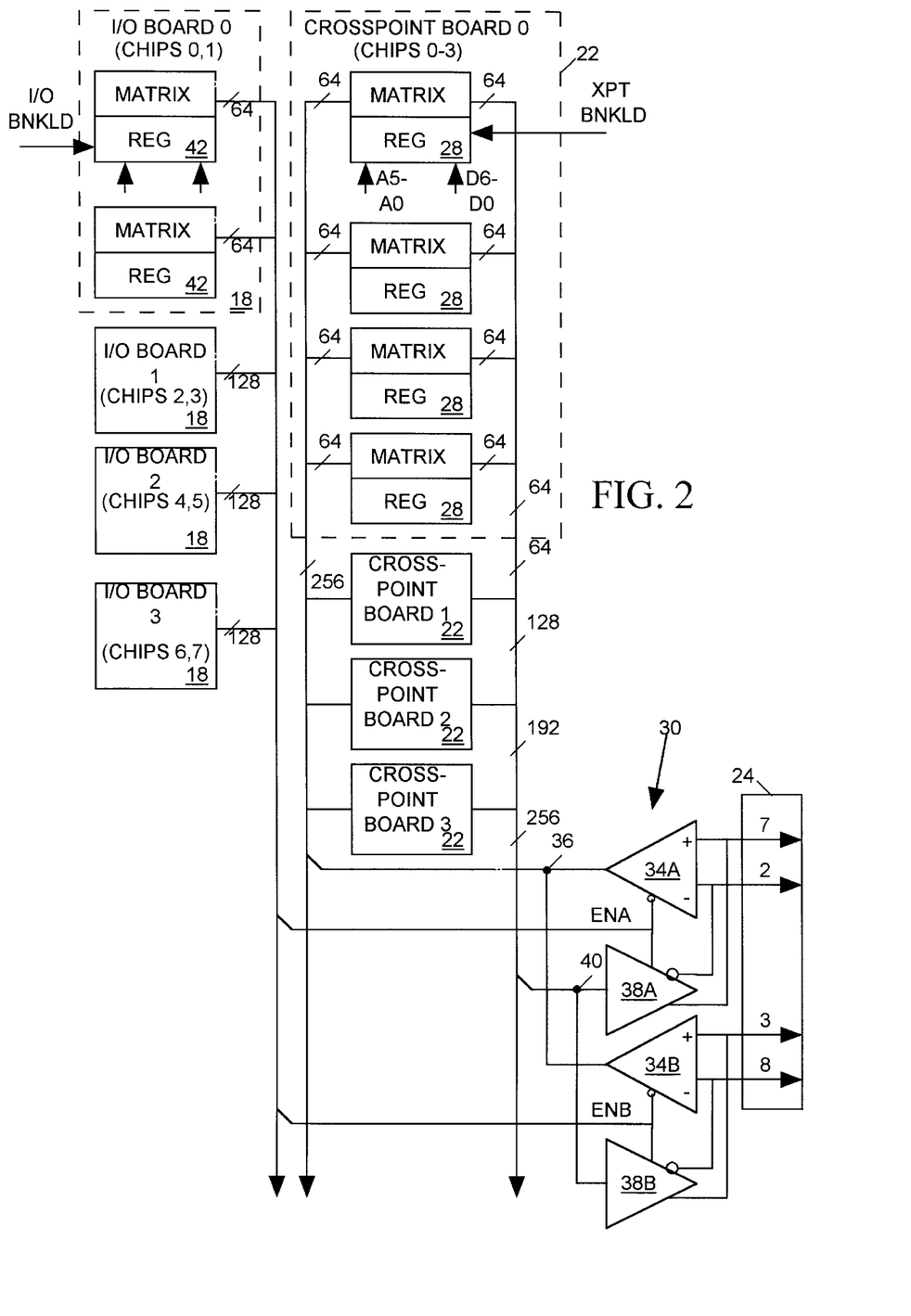
FIG. 2 is a more detailed block diagram illustrating crosspoint boards and I/O boards of the port switch.

The illustrated port switch is constructed on an external backplane 10, an internal backplane 14, four I/O boards 18 and four crosspoint boards 22. The external backplane carries a rectangular array of 256 9-pin D connectors 24 for connection to respective machines 26, and edge connectors which are engaged by the four I/O boards. The external backplane provides an electrical interface between the D connectors and the I/O boards. The internal backplane carries a first set of edge connectors which are engaged by the I/O boards and a second set of edge connectors which are engaged by the crosspoint boards. The internal backplane provides an electrical interface between the I/O boards and the crosspoint boards.

The port switch operates under control of an operator interface 54 which is used to input commands specifying a connection that is to be made and the time at which the connection is to be made relative to a reference time. The operator interface also provides status messages to the operator.

The operator commands are supplied by the operator interface 54 to an automation system 58 which issues commands to the port switch for executing the operator commands in the desired sequence and at the proper times. The automation system establishes a queue of tasks that are to be performed over an interval of up to about 18 minutes.

The automation system specifies tasks at time increments that are integer multiples of the vertical interval of the relevant video standard. It will be assumed that the relevant video standard is NTSC, in which case the vertical interval is about 16.67 ms. The automation system and the port switch operate under control of a common clock and are synchronized by reference to a count of vertical intervals. The automation system and the port switch keep track of the current frame number in a sequence and the automation system provides commands to the port switch to execute various tasks during specified vertical blanking intervals in the future.

Referring to FIG. 2, each crosspoint board 22 carries four crosspoint chips 28. Each crosspoint chip 28 includes a crosspoint matrix having 64 inputs and 64 outputs. The crosspoint chip also includes a staging RAM or control register which has 6-bit address A5–A0 and is able to store 7-bit data words D6–D0. Each address A5–A0 specifies an output of the matrix. The lower six bits of the data word D6–D0 can specify an input. If the bit D6 stored at a given address is 0, the output specified by that address is enabled and the input specified by the bits D5–D0 is connected to that output; and if the bit D6 is 1 and the bit D4 is 0, the output is placed in a high impedance state. Such crosspoint chips are commercially available.

On a given crosspoint board, the 64 outputs of the four matrixes are bussed together so that the four 64×64 matrixes function as a 256×64 crosspoint matrix. The four matrixes on each board each have 256 inputs and the 256 inputs are bussed together board-by-board. Consequently, the 16 crosspoint chips on the four crosspoint boards form a 256×256 crosspoint matrix. The 256×256 crosspoint matrix is referred to herein as the router matrix.

The port switch also includes 256 bidirectional serial communication ports 30 mounted on the four I/O boards in groups of 64. One of the ports 30 is illustrated in FIG. 2. Each port 30 includes two receivers 34A, 34B having a common output node 36 connected to an input of the router matrix and two transmitters 38A, 38B having a common input node 40 connected to an output of the router matrix. Each port can operate either as a controlling port or as a controlled port. In the controlling state of the port the receiver 34A and the transmitter 38B are enabled and the receiver 34B and transmitter 38A are disabled, and vice versa in the controlled state. The receiver 34A has its inverting and non-inverting inputs connected to pins 2 and 7 respectively of one of the 256 D connectors 24 mounted on the external backplane 10 and the transmitter 38B has its inverting and non-inverting outputs connected to pins 8 and 3 respectively. The receiver 34B has its inverting and non-inverting inputs connected to pins 8 and 3 and the transmitter 38A has its inverting and non-inverting inputs connected to pins 2 and 7. Each port 30 is thus associated with a single connector 24, a single router matrix input and a single router matrix output.

Each port 30 has two control terminals ENA and ENB. If ENA and ENB are both 0, the port is in a high impedance state (tristate) and is not in use. If ENA is 0 and ENB is 1, the port is controlling. If ENA is 1 and ENB is 0, the port is controlled. The state in which terminals ENA and ENB are both 1 is not allowed. Each terminal ENA or ENB of a given port can be specified using a logical address in the range 0–511. For a given port, the logical address of the terminal ENB is one greater than the logical address of the terminal ENA. Each port 30 can be considered to have a logical address equal to one-half the logical address of the terminal ENA.

The 256 D connectors 24 are mounted on the external backplane in a rectangular array. In order to facilitate identification of the connectors, each connector is labelled with a number in the range 1–256, the numbers progressing sequentially in rows and columns.

The ports are assigned respective numbers in the range 0–255 in accordance with the connectors to which they are respectively connected, i.e. ports 0–255 are connected to connectors 1–256 respectively. The 0-based number assigned to a port can be considered to be a physical address of the port.

Each router matrix input can be specified by a logical address in the range 0–255, and similarly each router matrix output can be specified by a logical address in the range 0–255. It would be convenient if the logical address of a port were the same as its physical address, the common output nodes of ports 0–255 were connected to router matrix inputs 0–255 respectively and the common input nodes of ports 0–255 were connected to router matrix outputs 0–255 respectively, but practical constraints, particularly in the routing of conductor runs on the circuit boards, may prevent connector i=1 (1-based) being connected to the port having the logical address i (0-based), and the common input and output nodes of the port having the logical address i being connected to the router matrix output i and the router matrix input i. For example, port 3 (logical) might be connected to connector 1, router matrix input 5 and router matrix output 4. For a given port there is, however, a set of constant offsets (one or more of which might be zero) between the port's logical address, the port's number, and the addresses of the router matrix input and output to which the port's common output and common input nodes are connected.

Figure 4:
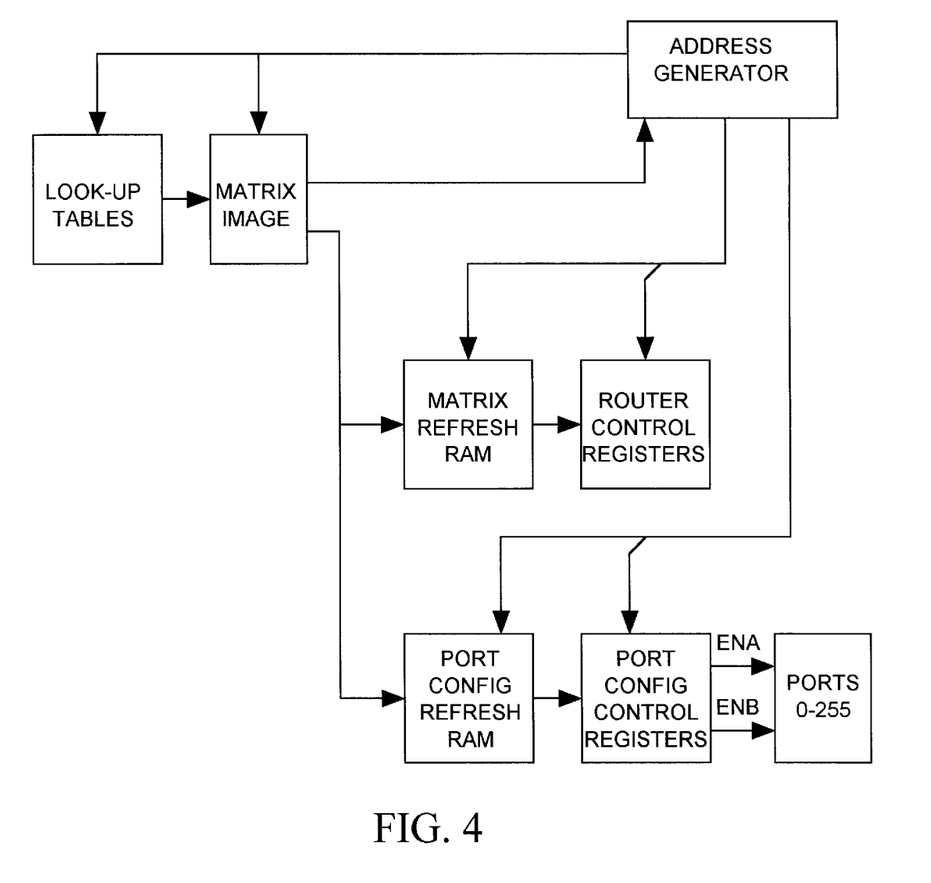
FIG. 4 illustrates schematically interaction between the matrix image array and refresh RAM on the crosspoint boards and the I/O boards.

The four crosspoint boards 22 carry respective segments of a matrix refresh RAM 46 (FIG. 4). Each segment stores one byte of data for each output of each of the four crosspoint chips 28 on the crosspoint board, i.e. four bytes for each of the 64 bussed outputs of the crosspoint board.

At the beginning of the vertical blanking interval of a video signal, the automation system asserts a bank load signal BNKLD in response to the vertical sync signal. The bank load signal BNKLD is applied to the crosspoint chips 28 and causes the data currently stored in the crosspoint control registers of the crosspoint chips 28 to be copied to the crosspoints. The connection defined by the contents of the control registers takes effect and remains in effect until the bank load signal BNKLD is next asserted. The copying of data from the control registers to the crosspoints takes place very rapidly, typically in less than about 100 $\mu$s.

After the data has been copied from the control registers to the crosspoints, the automation system scans the matrix refresh RAM with a 10-bit address and writes the values stored in the matrix refresh RAM to the control registers of the matrix chips 28 in preparation for the next assertion of the bank load signal BNKLD.

The address spaces for the four segments of the matrix refresh RAM 46 are contiguous. Bytes 0–63 from the refresh RAM are used to refresh the control register of chip 0 on crosspoint board 0, bytes 64–128 are used to refresh the control register of chip 1 on crosspoint board 0, and so on, bytes 960–1023 being used to refresh the control register of chip 3 on crosspoint board 3.

In a practical implementation, the address space of the control registers is not contiguous and there is a gap of 64 addresses between the address ranges for each of the control registers of the crosspoint chips 28. Accordingly, when the control register for chip 0 has been refreshed and the contents of the matrix refresh RAM for chip 1 have been read, the address used to address the control registers must be increased by 64 for refreshing the control register of chip 1. This is accomplished by including an extra bit in the addresses generated by the automation system. Thus, the address generator of the automation system generates an 11-bit address A10–A0. The automation system uses bits A10–A7, A5–A0 to address the matrix refresh RAM and uses bits A10 and A9 to select one of the four crosspoint boards, bits A8 and A7 to select one of the four chips on the selected board, and bits A5–A0 to select one of the 64 outputs. The sequence of addresses runs from 0 to 2047 but only alternate sets of 64 addresses are used to address the matrix refresh RAM and the control registers of the crosspoint chips 28.

The 8 data bits read from an address of the matrix refresh RAM are loaded into the corresponding address of the router's control registers. Bit D7 is zero. If bit D6 also is zero, bits D5–D0 select one of the 64 inputs of the selected chip on the selected board. If bit D6 is 1, the output specified by the address A5–A0 is held in a high impedance state. In the commercially available crosspoint chip that is used in the practical implementation of the invention, it is necessary for bit D4 to be zero as well as bit D6 to be 1 in order to place the output in the high impedance state.

A given combination of the address A10–A7, A5–A0 specifies an output of the router matrix and a given set of data bits D5–D0 specifies an input of the router matrix (assuming that D6 is zero). When the data bits D5–D0 are loaded into the control register address specified by the address A10–A7, A5–A0, the router matrix provides a connection between the router input and the router output.

Since each crosspoint chip output is bussed with equivalent outputs of the three other crosspoint chips on the same crosspoint board 22, it is necessary to ensure that if, for example, the address A10–A7, A5–A0 selects output 0 of chip 0 on board 0, output 0 of each of chips 1, 2 and 3 on board 0 will be placed in the high impedance state. This can be accomplished by writing data bits 1X0XXXX to each of the other addresses A10–A9, X, X, A5–A0, so that bits D6 and D4 at each of addresses 64, 128 and 192 on board 0 are 1 and 0 respectively.

Each I/O board 18 carries two 64×64 port configuration crosspoint chips 42, which are identical to the chips 28 on the crosspoint boards 22 but function as 64 bit addressable latches. Each chip 42 controls the states of 32 of the ports on the I/O board. Thus, the 64 outputs of chip 0 are paired as EN(0–31)A and EN(0–31)B and are connected to the control terminals of the associated ports 0–31 (logical) respectively. The 64 outputs of each of the other seven chips 42 are similarly arranged for controlling the states of the other ports.

The four I/O boards 18 carry respective segments of a port configuration refresh RAM. Each segment stores 2 bytes of data for each port on the I/O board.

The procedure for refreshing the control registers of the crosspoint chips 42 using the contents of the port configuration refresh RAM corresponds to the procedure for refreshing the control registers of the crosspoint chips 28 using the contents of the matrix refresh RAM. At the beginning of the vertical blanking interval, the automation system applies the bank load signal BNKLD to the crosspoint chips 42 and causes the data currently stored in the crosspoint control registers of the crosspoint chips 42 to be copied to the crosspoints. The connection defined by the contents of the control registers takes effect and remains in effect until the bank load signal BNKLD is next asserted.

After the data has been copied from the control registers to the crosspoints of the chips 42, the automation system scans the port configuration refresh RAM with a 9-bit address and writes the values stored in the port configuration refresh RAM to the control registers of the crosspoint chips 42 in preparation for the next assertion of the bank load signal BNKLD.

The address spaces for the four segments of the port configuration refresh RAM are contiguous. Bytes 0–63 from the refresh RAM are used to refresh the control register of chip 0 on I/O board 0, bytes 64–128 are used to refresh the control register of chip 1 on I/O board 0, and so on, bytes 448–511 being used to refresh the control register of chip 1 on I/O board 3.

In a practical implementation, the address space of the control registers of the crosspoint chips 42 is not contiguous and there is a gap of 64 addresses between the address ranges for each of the control registers of the crosspoint chips 42. Accordingly, when the control register for chip 0 has been refreshed and the contents of the port configuration refresh RAM for chip 1 have been read, the address used to address the control registers must be increased by 64 for refreshing the control register of chip 1. This is accomplished by including an extra bit in the addresses generated by the automation system. Thus, the address generator of the automation system generates an 10-bit address A9–A0. The automation system uses bits A9–A7, A5–A0 to address the port configuration refresh RAM and uses bits A9 and A8 to select one of the four I/O boards, bit A7 to select one of the two chips on the selected board, and bits A5–A0 to select one of the 64 outputs. The sequence of addresses runs from 0 to 1023 but only alternate sets of 64 addresses are used to address the port configuration refresh RAM and the control registers of the crosspoint chips.

The 512 bytes read from the port configuration refresh RAM are loaded into the crosspoint chips' control registers. Bit D7 of each byte is zero.

Figure 3:
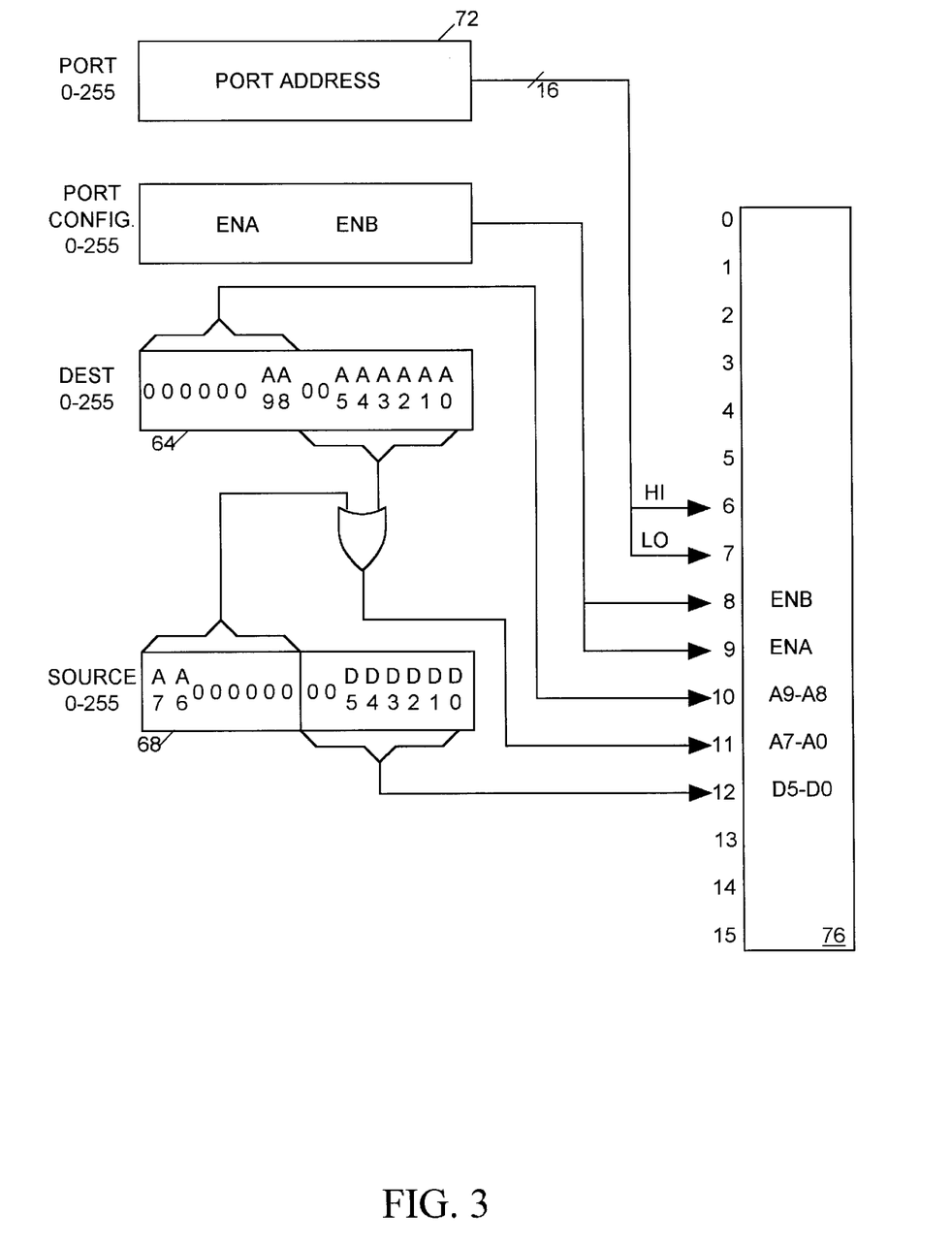
FIG. 3 illustrates the organization of lookup tables and a matrix image array in the automation system.

Referring to FIG. 3, the automation system includes three flash lookup tables storing a destination map 64, a source map 68 and a port configuration map 72. Each map is addressed by an 8-bit word which specifies a port address (physical) and returns a 16-bit word. The source map specifies the router matrix input to which the common output node of the port is connected and the destination map specifies the router matrix output to which the common input node of the port is connected. Thus, bits 5–0 of the source map contain the data bits D5–D0 and bits 15 and 14 contain the chip select bits A7–A6. Bits 5—0 of the destination map contain the address bits A5–A0 and bits 9 and 8 contain the board select bits A9–A8.

The word stored in the port configuration map specifies the logical address of the port.

It will therefore be seen that the flash look-up tables implicitly contain the offsets between the port's physical address and the port's logical address and the addresses of the router matrix input and output connected to the common output and input nodes respectively of the port.

The automation system includes a random access memory which stores a matrix image array 76. The matrix image array is a data structure containing one group of 16 bytes for each of the 256 ports. The matrix image contains a complete description of the state of the port switch. In each port group:

Byte 0 specifies the current port (physical) (the port that is currently connected to the port to which the group relates).

Byte 1 specifies the pending port (physical) (the port that will be connected to the port to which the group relates after a time stamp value has been counted down to zero).

Bytes 2 and 3 contain the time stamp high and low bytes respectively.

Byte 4 is the port tristate count down delay, which is the time (expressed in vertical intervals) after which the pending port will be configured for a new connection. The tristate countdown delay is generally uniform over all port groups and specifies the time for which the transmitter at the port will be held in a high impedance state after the current connection has been broken down, to ensure that the outputs are all in known state before the pending connection is made.

Byte 5 is port tristate configured delay, which is the time (measured in vertical intervals) for which the port remains in the high impedance state after a change in the connection involving the port. The tristate configured delay depends on the particular machine to which the port is connected, as will be explained in further detail below.

Bytes 6 and 7 are the high and low bytes respectively of the port configuration address, which is a 9-bit value specifying an address in the port configuration refresh RAM.

Bytes 8 and 9 are the port configuration values ENA and ENB respectively for the pending connection.

Byte 10 contains the board select bits A9–A8 for the pending connection.

Byte 11 contains the chip select bits A7–A6 and the register address A5–A0 for the pending connection.

Byte 12 contains the data bits D5–D0 for the pending connection.

Byte 13 contains various flags relating to the pending and current connections. The nature and function of the flags are not necessary to an understanding of the invention.

Bytes 14 and 15 are the high and low bytes respectively specifying the address of the first entry in a linked list data structure. The function of the linked list data structure will be described below in connection with distributed connections.

During an initialization sequence, the automation system addresses the port configuration lookup table with the port number and writes the port address into bytes 6 and 7 of the port group for that port. The operator supplies a port tristate countdown delay and the automation system writes this value into byte 4 of each port group. The operator may also supply a port tristate configured delay for one or more of the ports. The value of the port tristate configured delay depends on the machine connected to the port, and the automation system writes this value into byte 5 of the port group.

The port tristate configured delay is the time during which the port to which a machine is connected presents a high impedance to the machine following removal of a first connection and before a new connection is made. Certain older machines, particularly VTRs, when switching from one controlling machine to another, will enter an initialization sequence before being able to respond to commands, such as for record or play back. During the initialization sequence, the VTR may provide information regarding its operating characteristics, such as ballistic information, to the controlling machine so that this information will be available to the controlling machine. The port tristate configured delay is sufficient to ensure that the VTR will have completed its initialization sequence before it receives operating commands.

The manner of operation of the port switch will now be described with reference to a succession of connections. It will be assumed for the purpose of this discussion that the port switch has been initialized but that no connections have yet been made. Bytes 0 and 1 of each port group are set to the port value. Consequently, the common output node of each port is connected to the common input node of the same port and each port is therefore out of service. Bytes 2–5 are 0, bytes 8 and 9 are 4040H, bytes 10–12 are don't care, and bytes 13–15 are 0.

In the following discussion, port numbers are the 1-based physical port addresses unless the context indicates otherwise. Thus, port 0, for example, is connected to connector 1. It should be recognized, however, that in practice the operator will specify connections using 1-based numbers to identify the connectors to which particular machines are connected.

Connection 1—Port 0 to port 1 with reverse connection

Assuming that port 0 is connected to the source machine and port 1 is connected to the destination machine, the operator defines the pending connection by specifying the source machine as 0 and the destination machine as 1 and also specifies the time at which the connection is to be made. In this case, the forward connection is port 0 to port 1 and the reverse connection is port 1 to port 0. The operator interface supplies commands describing the forward and reverse connections to the automation system.

Generally, the port of the source machine will be a controlling port and the port of the destination machine will be a controlled port. Consequently, the port connected to the source machine must be configured as a controlled port and the port connected to the destination machine must be configured as a controlling port.

The automation system reads bytes 14 and 15 from the port groups 0 and 1 (the port groups for connectors 1 and 2). Since no previous connection has been made, these values are zero and do not require further action on the part of the automation system.

The automation system loads the port tristate count down delay into bytes 4 and 5 of port groups 0 and 1. The automation system also loads the port tristate configured delay for the machine connected to connector 1 into byte 5 of port group 0 and the port tristate configured delay for the machine connected to connector 1 into byte 5 of port group 1.

The automation system addresses the source and destination maps for the forward connection using the source address (0) and the destination address (1) respectively. The automation system writes the upper byte of the word read from the destination map to byte 10 of port group 0 and writes the lower byte of the word read from the source map to byte 12 of port group 0. The automation system ORs the lower byte of the word read from the destination map and the upper byte of the word read from the source map and writes the result into byte 11 of port group 0. The automation system writes the port address (physical) for the destination into byte 1 of port group 0. The automation system loads the value 4060H into bytes 8 and 9 and the time stamp value into bytes 2 and 3 of port group 0.

The automation system then uses the destination address (1) and the source address (0) to address the source and destination maps respectively. The automation system writes the upper byte of the word read from the destination map to byte 10 of port group 1 and writes the lower byte of the word read from the source map to byte 12 of port group 1. The automation system ORs the lower byte of the word read from the destination map and the upper byte of the word read from the source map. The automation system writes the port address (physical) for the source connector into byte 1 of port group 1. The automation system loads the value 6040H into bytes 8 and 9 and the time stamp value into bytes 2 and 3 of port group 1.

The foregoing sequence of operations sets up the port switch to make the desired connection at the time specified by the time stamp value. Using commercially available components and known operating techniques, it is possible to carry out all the necessary operations within the active part of one vertical interval of the NTSC signal, so that the values are available at the start of the vertical blanking interval.

At the end of the active part of each vertical interval, the automation system decrements the time stamp value stored in bytes 2 and 3 of each port group. When the time stamp stored in bytes 2 and 3 of a given port group reaches zero, the automation system reads bytes 10–12 of that group. The automation system adds a bit D6 (equal to zero) to D5–D0 and uses bytes 10 and 11 to generate an address for loading D6–D0 into the matrix map refresh RAM. The automation system also uses bytes 10 and 11 to generate three additional addresses, which specify the three addresses in the matrix map refresh RAM that are in the same segment as the address defined by bytes 10 and 11 and are offset from that address by an integer multiple of 64, and loads 1x0xxxx into those addresses. For example, if the chip select bits A7, A6 are 1, 0, the automation system writes the bits D6–D0 to the address (A9, A8, 1, 0, A5–A0) and writes 1x0xxxx to each of the addresses (A9, A8, 0, 0, A5–A0), (A9, A8, 0, 1, A5–A0) and (A9, A8, 1, 1, A5–A0). The automation system updates the control registers of the chips 28 using the contents of the matrix refresh RAM and on the next occurrence of the signal BNKLD, the contents of the control registers are copied to the matrixes of the chips 28 and the forward and reverse connections are made.

After decrementing the time stamp to zero, the automation system then decrements the tristate count down delay stored in byte 4. When the tristate count down delay stored in byte 4 of a given port group reaches zero, the automation system copies byte 5 (which may be zero) into byte 4 and then continues to decrement byte 4. When byte 4 of a given port group reaches zero, the automation system reads bytes 6–9 of that group. The automation system uses bytes 6 and 7 to generate an address for loading bytes 8 and 9 into the port configuration refresh RAM and updates the port configuration refresh RAM accordingly. When the signal BNKLD is next asserted, the data stored in the control registers of the crosspoint chips 42 is copied to the crosspoints and the ports connected to the designated inputs and outputs of the router matrix are enabled in the proper respective states.

The crosspoint chip 42 has only two active inputs, one of which is at logic 0 and the other at logic 1. D5–D0 equal to 40H selects the input at logic 0 and D5–D0 equal to 60H selects the input at logic 1.

The importance of the tristate count down delay will be discussed below.

The automation system updates the matrix image port groups for ports 0 and 1 by copying the value from byte 1 to byte 0 and clearing bytes 0 and 8–12.

At intervals of 16.67 ms, the automation system refreshes the router control registers and the I/O control registers using the contents of the matrix refresh RAM and the port configuration refresh RAM. By refreshing the control registers at the vertical rate, it is ensured that the delay before the registers are refreshed is no more than one vertical interval (16.67 ms). Thus, for example, if a crosspoint board is found to be defective and is replaced, the maximum delay between installing the replacement board and configuring the replacement board to reflect the matrix image is 16.67 ms.

Connection 2—port 10 to ports 11 and 12 with reverse connection from port 11 to port 10

The operator defines the pending connection by specifying the source machine as 10, the responding destination machine as 11 and the non-responding destination machine as 12. The operator also specifies the time at which the connection is to be made.

Port 10 must be configured as a controlled port and ports 11 and 12 must be configured as controlling ports, with the reverse connection from port 12 to the router input being blocked.

The operations necessary to make connection 2 are the same as those needed for connection 1 except to the extent that connection 2 is a distributed connection. Therefore, only the differences necessitated by the fact that connection 2 is a distributed connection will be discussed.

Bytes 10–12 of the port group for port 10 are constructed using port 11 as the destination and without reference to port 12. Bytes 10–12 of the port group for port 11 are constructed using port 10 as the destination and without reference to port 12. Bytes 10–12 of the port group for port 12 are constructed using port 12 as the source and port 10 as the destination and without reference to port 11. Port 12 must be configured as a controlling port and therefore the automation system writes 6040H into bytes 8 and 9 of the port group for port 12.

In the event that the operator instructs the port switch to make a distributed connection, the automation system constructs a linked list data structure which identifies the destination ports 30 of the port switch, and hence the controlled ports of the machines connected to the port switch. Each entry in the linked list data structure has three bytes. The first byte of each entry is the number of a destination port and the other two bytes are the high and low bytes of the address of the next entry in the data structure. If this address is zero, there are no other entries in the data structure. The address of the first entry in the data structure is stored in bytes 14 and 15 of the port group for the source port of the port switch.

In the case of connection 2, the automation system determines that ports 11 and 12 are destination ports. The automation system therefore constructs a linked list data structure in which the first entry contains the 0 based number of one of the ports, e.g. 11, and the 2-byte address of the second entry in the data structure. The second entry contains the value 12 in the first byte. Since there are no other destination ports in the distributed connection, the second and third bytes are zero. The automation system stores the address of the first entry in the data structure in bytes 14 and 15 of the port group for the source port, i.e. port 10.

Connection 3—port 0 to port 2 without reverse path

The explicit statement that there is to be no reverse path implies that connection 1 is not broken. Thus, connection 3 changes connection 1 to a distributed connection. Port 0 remains the source, port 1 remains the responding destination and port 2 is a non-responding destination.

Immediately before the command for connection 3 is issued, byte 0 of port group 0 contains the value 1 (for the connection to port 1) and byte 1 contains the value 0, indicating that no pending connection has been defined.

The automation system reads bytes 14 and 15 from the port groups for connectors 0, 1 and 2. Since no previous distributed connection has been made involving these ports, these values are zero and do not require further action on the part of the automation system.

The procedure for making the distributed connection of connectors 0, 1 and 2 corresponds to that used in Connection 2 for connectors 10, 11 and 12.

Connection 4—port 3 to port 2 with reverse path

The explicit statement that there is to be a reverse path indicates that the current connection of port 2, i.e. Connection 3, is to be undone.

The automation system reads bytes 14 and 15 from each port group involved in the new connection and, in the event that the address stored in bytes 14 and 15 of any port group is not zero, the automation system tracks through the linked lists addressed by the matrix image. For each port found in the linked list, the automation system writes values of ENA and ENB into the respective port group for disconnecting the respective ports. In this case, the automation system determines from bytes 14 and 15 of port group 0 show that only ports 1 and 2 are destination ports.

The automation system breaks down the existing connection of ports 0, 1 and 2 by writing ENA and ENB value of 40H to bytes 8 and 9 of port groups 0, 1 and 2. During the active part of the next vertical interval, the values of ENA and ENB are transferred to the appropriate addresses in the port configuration refresh RAM. During the next blanking interval, the contents of the port configuration refresh RAM are used to refresh the control registers of the I/O matrix chips and ports 0, 1 and 2 are placed in the high-impedance state. The signal paths through the router remain intact.

The tristate count down delay stored in byte 4 of the matrix image is the time between undoing the current connection and making the new connection. It ensures that the router outputs involved in the current connection are all in a known state before the pending connection is made.

The automation system is then able to make the new distributed connection in similar manner to the connection of ports 10, 11 and 12.

Connection 5—port 0 to port 1 without reverse path

By examining the port groups for ports 0 and 1, the automation system determines that ports 1 and 2 are not currently in a connection.

The procedure for making connection 5 is the same as for connection 1 except that the reverse connection from port 1 to port 0 is not made. Thus, port group 1 specifies that port 1 is controlling but the byte that is loaded into the I/O control register at the address for selecting port 0 (the return path) has D6 equal to 1 so that router output connected to the common input node of port 0 is in a high-impedance state.

Connection 6—port 0 to port 2 without reverse path

Since port 2 is to be connected to port 1, the current connection of port 2 to port 3 must be undone. Port 3 is therefore placed in the high-impedance state, in the manner discussed in connection with connection 2.

The connection of port 0 to port 1 is not affected. Both port 1 and port 2 are destination, and neither is a responding destination.

The automation system constructs a linked list data structure containing entries pertaining to ports 1 and 2 and stores the address of the first entry in bytes 14 and 15 of the port group for port 0.

Since the lookup tables relate the logical addresses of the ports and the logical addresses of the router inputs and outputs to the physical addresses of the ports, the operator can specify connections by reference to connector numbers and without knowing how the logical addresses of the ports relate to the connector numbers. Operation of the port switch is independent of scrambling of the connections between the connectors and the ports and is independent of any offset between the logical port addresses and the addresses of the router inputs and outputs.

It will be seen from the foregoing that the method of operation described above allows the port switch to execute a forward and reverse connection at a specified time in the future. It is not necessary to scan the entire contents of the matrix image or other memory in order to identify the destinations that are connected to a given source and break down an existing connection. On the contrary, the destinations can be identified rapidly by examining bytes 14 and 15 of the port group for the source.

It will be appreciated that the invention is not restricted to the particular embodiment that has been described, and that variations may be made therein without departing from the scope of the invention as defined in the appended claims and equivalents thereof. For example, although it is convenient to accommodate the possible offsets between the address for a port, the number of the connector associated with the port and the addresses of the router input and output nodes using the look-up tables, the invention is not restricted to this feature. By suitably routing conductor runs on the circuit boards, the offsets could be eliminated. Further, although the addressable latch is implemented using crosspoint matrix chips, this is for convenience and is not essential to the invention.

What is claimed is:

1. A method of operating a port switch including n bidirectional communication ports, where n>2, and a router having n inputs connected to the n ports respectively and n outputs connected to the n ports respectively and including an addressable register means which can be loaded with data defining at least a first connection through the router between the ith router input (1<=i<=n) and the jth router output (1<=j<=n) and a second connection through the router between the kth router input (1<=k<=n and k i) and the lth router output (1<=l<=n and l j), and a switch means responsive to the data in the addressable register means for connecting the ith router input to the jth router output and for connecting the kth router input to the lth router input, the method comprising:

creating a source lookup table containing, for each port, an entry specifying the router input that is connected to that port, creating a destination lookup table containing, for each port, an entry specifying the router output that is connected to that port, and establishing forward and reverse connections between a uth port (1<=u<=n) and a vth port (1<=v<=n) by:

addressing the source lookup table with addresses associated with the uth and vth ports and reading respective router inputs, addressing the destination lookup table with addresses associated with the uth and vth ports and reading respective router outputs, creating a matrix image data structure containing entries specifying at least the router inputs for the uth and vth ports and the router outputs for the uth and vth ports, and utilizing the router input and router output entries in the matrix image data structure to refresh the addressable register means.

2. A method according to claim 1, comprising transferring data from the matrix image data structure to a refresh RAM and employing data stored in the refresh RAM to refresh the addressable register means.

3. A method according to claim 1, wherein the step of creating the matrix image data structure comprises creating a port group for each port, and wherein the port group for the uth port contains entries specifying at least the router input for the uth port and the router output connected to the vth port and the port group for the vth port contains entries specifying at least the router input for the vth port and the router output connected to the uth port.

4. A method according to claim 1, comprising writing data specifying the router input of the uth port to a refresh RAM using an address derived from the router output for the vth port, writing data specifying the router input of the vth port to the refresh RAM using an address derived from the router output for the uth port, and employing data stored in the refresh RAM to refresh the addressable register means.

5. A method according to claim 1, including creating a data structure containing a list of ports connected to the vth port and wherein the step of creating the matrix image data structure includes the step of creating an entry specifying a pointer to the list.

6. A method of operating a port switch including n bidirectional I/O communication ports, where n>2, each port having at least a first state in which it propagates a signal in a first direction and a second state in which it propagates a signal in a second direction, an addressable latch means having n outputs connected to the ports respectively for establishing the state of each port, and a router having n inputs connected to the n ports respectively and n outputs connected to the n ports respectively and including an addressable register means which can be loaded with data defining at least a first connection through the router between the ith router input (1<=i<=n) and the jth router output (1<=j<=n) and a second connection through the router between the kth router input (1<=k<=n and k i) and the lth router output (1<=l<=n and l j), and a switch means responsive to the data in the addressable register means for connecting the ith router input to the jth router output and for connecting the kth router input to the lth router input, the method comprising:

creating a source lookup table containing, for each port, an entry specifying the router input that is connected to that port, creating a destination lookup table containing, for each port, an entry specifying the router output that is connected to that port, and establishing a connection between a uth port (1<=u<=n) in a first operating state and a vth port (1<=v<=n) in a second operating state by:

addressing the source lookup table with an address associated with the uth port and reading a router input, addressing the destination lookup table with an address associated with the destination port and reading a router output, creating a matrix image data structure containing, for the uth port, entries specifying at least the router input for the uth port, the first operating state, and the router output connected to the vth port, and, for the vth port, entries specifying at least the router input for the vth port, the second operating state, and the router output connected to the uth port, and utilizing the operating state entries in the matrix image data structure for the uth and vth ports to refresh the addressable latch means and utilizing the router input and router output entries in the matrix image data structure for the uth and vth ports to refresh the addressable register means.

7. A method according to claim 6, further comprising:

creating a port configuration lookup table containing, for each port, an entry specifying a port address for that port, and wherein the method includes an initialization step of addressing the port configuration lookup table with addresses associated with the ports and reading the port addresses and including the port addresses returned by the port configuration table in the matrix image data structure, and the step of establishing the connection includes utilizing the port addresses for the uth and vth ports to address the addressable latch means and refresh the addressable latch means with the operating states of the ports.

8. A method according to claim 7, comprising writing data specifying the operating state of the uth port to a refresh RAM using the port address for the uth port, writing data specifying the operating state of the vth port to the refresh RAM using the port address of the vth port, and employing data stored in the refresh RAM to refresh the addressable latch means.

9. A method of operating a port switch including a plurality of communication ports and a router including an addressable register which can be loaded with data defining a connection between two of said ports for connecting those ports, the method comprising establishing a new connection within a specified time interval by:

inputting a value specifying a first port, inputting a value specifying a second port, specifying a time interval, creating a data structure containing at least an address for the first port, an address for the second port and the specified time value, measuring lapse of time toward start of the specified time interval, before start of the specified time interval, transferring data from the data structure to a refresh memory means, during the specified time interval, refreshing the addressable register with the contents of the refresh memory means.

10. A method of operating a port switch including a plurality of communication ports and a router including an addressable register which can be loaded with data defining a connection between two of said ports for connecting those ports, comprising:

creating a source lookup table containing, for each port, an entry specifying a router input that is connected to that port, creating a destination lookup table containing, for each port, an entry specifying a router output that is connected to that port, establishing a connection between a source port and a destination port by:

addressing the source lookup table with an address associated with the source port, addressing the destination lookup table with an address associated with the destination port, inputting a time stamp value specifying start of a time interval, creating a matrix image data structure containing, for the source port, entries specifying at least the router input for the source port, the state of the port when a pending connection is made, the router output for the destination port, and the time stamp, before the start of the time interval specified by the time stamp value, transferring data from the matrix image to a matrix refresh memory means, and during said time interval, refreshing the crosspoint register with the input and output data from the matrix image.

11. A port switch including n bidirectional communication ports, where n>2, and a router having n inputs connected to the n ports respectively and n outputs connected to the n ports respectively and including an addressable register means which can be loaded with data defining at least a first connection through the router between the ith router input (1<=i<=n) and the jth router output (1<=j<=n) and a second connection through the router between the kth router input (1<=k<=n and k i) and the lth router output (1<=l<=n and l j), a switch means responsive to the data in the addressable register means for connecting the ith router input to the jth router output and for connecting the kth router input to the lth router input, and a controller programmed to operate the port switch in accordance with a method which comprises:

creating a source lookup table containing, for each port, an entry specifying the router input that is connected to that port,     creating a destination lookup table containing, for each port, an entry specifying the router output that is connected to that port, and     establishing forward and reverse connections between a uth port ($1<=u<=n$) and a vth port ($1<=v<=n$) by:

addressing the source lookup table with addresses associated with the uth and vth ports and reading respective router inputs,         addressing the destination lookup table with addresses associated with the uth and vth ports and reading respective router outputs,         creating a matrix image data structure containing entries specifying at least the router inputs for the uth and vth ports and the router outputs for the uth and vth ports, and         utilizing the router input and router output entries in the matrix image data structure to refresh the addressable register means.

12. A port switch according to claim 11, comprising a refresh RAM and wherein the controller is programmed to transfer data from the matrix image data structure to the refresh RAM and employ data stored in the refresh RAM to refresh the addressable register means.

13. A port switch according to claim 11, wherein the controller is programmed to create the matrix image data structure by creating a port group for each port, the port group for the uth port containing entries specifying at least the router input for the uth port and the router output connected to the vth port and the port group for the vth port containing entries specifying at least the router input for the vth port and the router output connected to the uth port.

14. A port switch according to claim 11, comprising a refresh RAM and wherein the controller is programmed to write data specifying the router input of the uth port to the refresh RAM using an address derived from the router output for the vth port, write data specifying the router input of the vth port to the refresh RAM using an address derived from the router output for the uth port, and employ data stored in the refresh RAM to refresh the addressable register means.

15. A port switch according to claim 11, wherein the controller is programmed to create a data structure containing a list of ports connected to the vth port and to create the matrix image data structure by creating an entry specifying a pointer to the list.

16. A port switch including n bidirectional I/O communication ports, where n>2, each port having at least a first state in which it propagates a signal in a first direction and a second state in which it propagates a signal in a second direction, an addressable latch means having n outputs connected to the ports respectively for establishing the state of each port, and a router having n inputs connected to the n ports respectively and n outputs connected to the n ports respectively and including an addressable register means which can be loaded with data defining at least a first connection through the router between the ith router input ($1<=i<=n$) and the jth router output ($1<=j<=n$) and a second connection through the router between the kth router input ($1<=k<=n$ and k i) and the lth router output ($1<=l<=n$ and l j), a switch means responsive to the data in the addressable register means for connecting the ith router input to the jth router output and for connecting the kth router input to the lth router input, and a controller programmed to operate the port switch in accordance with a method comprising:

creating a source lookup table containing, for each port, an entry specifying the router input that is connected to that port,     creating a destination lookup table containing, for each port, an entry specifying the router output that is connected to that port, and     establishing a connection between a uth port ($1<=u<=n$) in a first operating state and a vth port ($1<=v<=n$) in a second operating state by:

addressing the source lookup table with an address associated with the uth port and reading a router input,         addressing the destination lookup table with an address associated with the destination port and reading a router output,         creating a matrix image data structure containing, for the uth port, entries specifying at least the router input for the uth port, the first operating state, and the router output connected to the vth port, and, for the vth port, entries specifying at least the router input for the vth port, the second operating state, and the router output connected to the uth port, and         utilizing the operating state entries in the matrix image data structure for the uth and vth ports to refresh the addressable latch means and utilizing the router input and router output entries in the matrix image data structure for the uth and vth ports to refresh the addressable register means.

17. A port switch according to claim 16, wherein the controller is programmed to create a port configuration lookup table containing, for each port, an entry specifying a port address for that port.

18. A port switch according to claim 17, wherein the controller is programmed to initialize the port switch by addressing the port configuration lookup table with addresses associated with the ports and reading the port addresses and including the port addresses returned by the port configuration table in the matrix image data structure, and to perform the step of establishing the connection by utilizing the port addresses for the uth and vth ports to address the addressable latch means and refresh the addressable latch means with the operating states of the ports.

19. A port switch including a plurality of communication ports, a router including an addressable register which can be loaded with data defining a connection between two of said ports for connecting those ports, and a controller programmed to operate the port switch in accordance with a method which comprises establishing a new connection at a specified time by:

inputting a value specifying a first port, inputting a value specifying a second port, specifying a time interval, creating a data structure containing at least an address for the first port, an address for the second port and the specified time value,     measuring lapse of time toward start of the specified time interval,     before start of the specified time interval, transferring the contents of the data structure to a refresh memory means,     during the specified time interval, refreshing the addressable register with the contents of the refresh memory means.

20. A port switch according to claim 19, comprising a refresh RAM and wherein the controller is programmed to write data specifying the operating state of the uth port to the refresh RAM using the port address for the uth port, write data specifying the operating state of the vth port to the refresh RAM using the port address of the vth port, and employ data stored in the refresh RAM to refresh the addressable latch means.

21. A port switch including a plurality of communication ports, a router including an addressable register which can be loaded with data defining a connection between two of said ports for connecting those ports, an a controller programmed to operate the port switch by a method comprising:

creating a source lookup table containing, for each port, an entry specifying a router input that is connected to that port, creating a destination lookup table containing, for each port, an entry specifying a router output that is connected to that port, establishing a connection between a source port and a destination port by:

addressing the source lookup table with an address associated with the source port, addressing the destination lookup table with an address associated with the destination port, inputting a time stamp value specifying start of a time interval, creating a matrix image data structure containing, for the source port, entries specifying at least the router input for the source port, the state of the port when a pending connection is made, the router output for the destination port, and the time stamp, before the start of the time interval specified by the time stamp value, transferring the contents of the matrix image to a matrix refresh memory means, and during said time interval, refreshing the crosspoint register with the input and output data from the matrix image.

* * * * *

UNITED STATES PATENT AND TRADEMARK OFFICE
CERTIFICATE OF CORRECTION

PATENT NO. : 6,182,185 B1
DATED : January 30, 2001
INVENTOR(S) : David H. Stokes It is certified that error appears in the above-identified patent and that said Letters Patent is hereby corrected as shown below:

Column 16,
Line 19, (claim 1, line 9), "(1<=k<=n and ki)" should be deleted and replaced with -- (1<=k<=n and k≠i) --.
Line 20, (claim 1, line 10), "(1<=l<=n and lj)" should be deleted and replaced with -- (1<=l<=n and l≠j) --.

Column 17,
Line 16, (claim 6, line 14), "(1<=k<=n and ki)" should be deleted and replaced with -- (1<=k<=n and k≠i) --.
Line 17, (claim 6, line 15), "(1<=l<=n and lj)" should be deleted and replaced with -- (1<=l<=n and l≠j) --.

Column 18,
Line 65, (claim 11, line 9), "(1<=k<=n and ki)" should be deleted and replaced with -- (1<=k<=n and k≠i) --.
Lines 65 and 66, (claim 11, lines 9 and 10), "(1<=l<=n and lj)" should be deleted and replaced with -- (1<=l<=n and l≠j) --.

Column 19,
Line 66, (claim 16, line 14), "(1<=k<=n and ki)" should be deleted and replaced with -- (1<=k<=n and k≠i) --.
Lines 66 and 67, (claim 16, lines 14 and 15), "(1<=l<=n and lj)" should be deleted and replaced with -- (1<=l<=n and l≠j) --.

Signed and Sealed this

Twenty-third Day of October, 2001

Attest:

*Attesting Officer*

NICHOLAS P. GODICI
*Acting Director of the United States Patent and Trademark Office*